Patented Jan. 16, 1940

2,187,108

UNITED STATES PATENT OFFICE 2,187,108

PROCESS OF PURIFYING LEAD NITRATE SOLUTIONS

Bodine Brinton Barrett, Newark, N. J., assignor to E. I. du Pont de Nemours & Company, Wilmington, Del., a corporation of Delaware No Drawing. Application May 27, 1938, Serial No. 210,429

5 Claims. (Cl. 23—102)

This invention relates to the purification of solutions of lead nitrate, and more particularly to the removal of metallic impurities from said solutions.

The presence of metallic impurities, such as copper, bismuth and antimony, in metallic lead is well known and numerous metallurgical methods of purification have been proposed. Several such methods are in common commercial use, but the best purified pig lead still contains minute traces of such impurities.

In the manufacture of lead chromate pigments, such as chrome yellow, chrome orange, and chrome greens, it is customary to use a soluble salt, such as lead nitrate, as a starting material. This is usually prepared by corroding metallic lead in the presence of aqueous solutions of nitric acid. Such process carries into solution metallic impurities, such as copper, bismuth, antimony and occasionally iron, which are harmful to the production of satisfactory lead chromate pigments. Copper is especially deleterious and objectionable since it exerts an extremely harmful effect on the resulting lead chromate pigments, when present in amounts to as low as about 0.01% by weight, on the basis of the lead present.

Various manufacturing operations exist from which impure lead residues, as by-products, are obtained, and which offer attractive economies for pigment production. However, these residual lead sludges usually contain a relatively high impurity content, the copper portion thereof ranging to as high as about .3% or higher by weight on a lead basis. Heretofore, no practical method of using these low cost lead residues in the manufacture of lead chromates has been available and consequently it has been very difficult, if not impossible, to employ them in such manufactures. Processes proposed for effecting impurity removal, particularly copper, from such residual lead nitrate solutions include the introduction of metallic lead into the vats. This method, although theoretically attractive, suffers from serious deficiencies when an attempt is made to adopt the same on a commercial scale. Principally, it is very difficult in such processes to obtain the proper contact of the impure solution with the free metal in an economically feasible period of time. Furthermore, as a layer of impurity builds up on the lead, the rate of reaction, which at best is slow, decreases very rapidly. Other methods such as electrolytic purification have likewise proved slow, expensive and inefficient.

It is, accordingly, among the objects of this invention to overcome these difficulties and to provide a novel and efficient method for purifying solutions of lead nitrate in order to render them useful in the production of lead chromate pigments. A further and specific object includes the provision of a process adapted to effectively remove objectionable quantities of soluble copper salts present in such solutions. A still further object is to effect removal of other metallic impurities therefrom, as for instance traces of soluble salts of iron, bismuth and antimony.

These and other objects are accomplished in my invention which broadly comprises adding a soluble ferro-cyanide to a solution of lead nitrate containing metallic impurities as soluble salts, thereby precipitating such impurities out of said solution, and then removing the resultant precipitate and recovering the lead nitrate in purified condition.

In a more specific embodiment, the invention comprises treating at elevated temperatures a relatively impure lead nitrate solution with an excess proportion of a soluble ferro-cyanide such as sodium ferro-cyanide to precipitate the metallic impurities present in said solution, removing the resultant precipitate and recovering the lead nitrate solution in a purified state.

In order that the invention may be more clearly understood, the following specific example is given, said example to be taken as in no wise in limitation of the scope or underlying principles of my invention:

Example I 100 gallons of lead nitrate solution (specific gravity 1.215) containing approximately 21% $Pb(NO_3)_2$ by weight is determined by analysis to contain 0.045% copper by weight in solution (0.34% by weight on the basis of metallic lead), or slightly less than 0.5 pound copper. To this solution is added 4.3 pounds of sodium ferro-cyanide (yellow prussiate of soda or

$Na_4Fe(CN)_6.10H_2O)$

The addition is carried out over a period of about 30 minutes at a temperature of about 150° F. When a suitable control test shows the substantial absence of copper from solution, the precipitate is removed by filtration and the clear lead nitrate is run to storage for use as desired. Analysis shows the amount of copper remaining to be about 0.0001% by weight on a solution basis (0.0007% on a lead basis).

The precipitate is found to contain a substantial amount of lead, equivalent roughly to ten pounds of lead nitrate lost for every pound of copper removed from solution and corresponding to a yield loss of about 2.5%.

The ferrocyanides of the various metals mentioned, viz., lead, copper, bismuth, antimony and iron are known to be relatively insoluble in water. Data as to actual solubilities are not clear cut and are confused by the tendency of ferrocyanides to form gelatinous precipitates of uncertain constitution. Theoretically, a precipitate obtained by adding a soluble ferrocyanide to a lead nitrate solution containing one or more of the above contaminating metals should be a mixture of the various insoluble ferrocyanides in proportions determined by the relative concentrations of the salts in the original solution and by the solubilities of the several ferrocyanides.

The following reactions are typical of those which may be presumed to take place:

(1) $2Cu^{++} + Na_4Fe(CN)_6 \rightarrow Cu_2Fe(CN)_6 + 4Na^+$
(2) $2Pb(NO_3)_2 + Na_4Fe(CN)_6 \rightarrow Pb_2Fe(CN)_6 + 4NaNO_3$ However, it is highly probable that the insoluble precipitate is not composed of a mixture of the pure chemical compounds which the formulas would indicate. I am unable to determine its exact composition beyond the fact that it contains a relatively large proportion of lead to the other metals. Nevertheless this loss of lead is relatively small compared with the importance of the removal of the copper and other contaminating metals from the solution.

Therefore, I have found it preferable to employ a relatively small excess of soluble ferrocyanide over the theoretical amount indicated by reaction (1) above, and that such small excess will suffice to remove the copper and other contaminating metals from the solution. Generally, from about 1.25 to about 2.5 times the theoretical amount of ferrocyanide appears to be the optimum for effecting removal of substantially all the copper without an excessive loss of lead. Thus, although the sodium ferrocyanide used in the above example corresponds to 2.5 times the theoretical amount necessary to remove the copper present, this may be further reduced to as low as 1.25 times the theoretical with a very good purification and a somewhat lower loss of lead nitrate. Although the degree of purification is slightly less than with the larger amount of ferrocyanide, it is frequently sufficient and questions of economy make the lower excess preferable in some cases. As already indicated, however, as the amount of impurities increase, it will be found desirable to use larger amounts of ferrocyanide. In a given instance, the optimum ratio of soluble ferrocyanide to the theoretical can be easily determined by experiment. Lower and higher amounts can be employed and with successful results. Generally, lower amounts will not effect as complete removal of the soluble copper or other metallic impurities, while higher amounts tend to effect undesired lead nitrate losses. A useful and preferable upper limit comprises that already mentioned, i. e., not to exceed about 2.5 times the theoretical required.

As will be apparent, the conditions specified hereinabove and in the foregoing example are not generally critical and variance therefrom may be suitably had. Similarly, the type of soluble ferrocyanide employed in the invention is relatively unimportant, economic considerations suggesting sodium ferrocyanide as most feasible due to its ready availability and inexpensiveness. Accordingly, the term "soluble ferrocyanide", as used herein, is to be construed in its broadest sense and to include other types of ferrocyanides, such as those of potassium or calcium, as well as those which are ordinarily considered insoluble. In the use of such ferrocyanides, the effect of contaminating ion introduction into the lead nitrate must also be considered and in the light of the subsequent use of the purified material. For instance, if it is desired to completely eliminate the effect of the contaminating ion, such as the sodium ion, it is possible to effect the removal of the copper or other metallic impurity by adding a freshly prepared and washed slurry of lead ferrocyanide to the lead nitrate solution. Although this method effects an efficient removal of the copper, it involves an extra operation and is, therefore, not my preferred procedure.

The conditions of temperature, time of addition of the ferrocyanide, rate of agitation and the like are also non-critical and are largely determined by the condition of the precipitate and its ease of filtration. At best, it is a slimy material and somewhat difficult to filter and the conditions described are those which have been found to be most conducive to the formation of a readily filterable precipitate.

Although throughout the description of the invention, the removal of copper from lead nitrate solutions has been stressed, removal of other metallic impurities therefrom, notably iron, bismuth and antimony, frequently present in lead nitrate from impure sources of lead, is contemplated. I have found that my purification step removes bismuth and antimony equally as well as it removes copper and, furthermore, that it removes a large part of the iron. A slight modification such as the adjustment of the hydrogen ion concentration to a value lower than that represented by a pH of 4.0 will effect complete removal of the iron.

It will be apparent from the foregoing that the present invention affords a novel method for preparing lead nitrate from contaminated, impure residues whereby said nitrate is rendered fit for use in the production of lead chromate pigments. The product recovered will be in relatively pure condition and free from objectionable quantities of contaminating metallic impurities, particularly copper, which would otherwise inhibit the use of such residues in pigment production.

I claim as my invention:

1. A method for purifying lead nitrate through removal of copper impurities present therein and while avoiding any substantial loss of lead, comprising subjecting a solution of lead nitrate to reaction with a soluble ferrocyanide from the group consisting of alkali and alkaline earth metal ferrocyanides, employing an excess amount of such ferrocyanide ranging from about 1.25 to about 2.5 times that stoichiometrically required to precipitate the copper as cupric ferrocyanide, and separating the purified lead nitrate from the reaction precipitate.

2. A method for purifying lead nitrate through removal of copper imprities present therein and while avoiding any substantial loss of lead, comprising subjecting a solution of lead nitrate to reaction with a soluble sodium ferrocyanide, employing an excess amount of such ferrocyanide ranging from about 1.25 to about 2.5 times that stoichiometrically required to precipitate the copper as cupric ferrocyanide, and separating the purified lead nitrate from the reaction precipitate.

3. A method for treating copper-containing lead nitrate to purify the same by removing metallic impurities present therein while avoiding any substantial loss of lead, comprising treating a lead nitrate solution with a soluble ferrocyanide from the group consisting of alkali and alkaline earth metal ferrocyanides, employing in such treatment an excess amount of said ferrocyanide ranging from substantially 1.25 to about 2.5 times that stoichiometrically required to precipitate the copper as cupric ferrocyanide, and separating the purified lead nitrate from the reaction precipitate.

4. A method for treating copper-containing lead nitrate to purify the same by removing metallic impurities present therein while avoiding any substantial loss of lead, comprising subjecting a lead nitrate solution to treatment with a soluble ferrocyanide from the group consisting of alkali and alkaline earth metal ferrocyanides, employing in such treatment an excess quantity of said ferrocyanide ranging from about 1.25 to about 2.5 times that stoichiometrically required to precipitate the copper as cupric ferrocyanide, heating the resultant mixture to precipitate said metallic impurities, and separating the purified lead nitrate from the reaction precipitate.

5. A method for treating copper-containing lead nitrate to reduce the amount of metallic impurities present therein below substantially 0.01%, based on the weight of the lead, while avoiding any substantial loss of lead, comprising adding to a lead nitrate solution a soluble sodium ferrocyanide in excess proportion ranging from about 1.25 to about 2.5 times that stoichiometrically required to precipitate the copper as cupric ferrocyanide, heating the resultant mixture to effect precipitation of said metallic impurities, and separating the purified lead nitrate from the reaction precipitate.

BODINE B. BARRETT.